United States Patent [19]

Rikuta

[11] 4,175,433

[45] Nov. 27, 1979

[54] METHOD OF AND APPARATUS FOR THE MEASUREMENT OF THE RATE OF FLOW BY MEANS OF A BYPASS

[76] Inventor: Sotokazu Rikuta, 2-24-7 Koun-cho, Maebashi-shi, Gunma-ken, Japan, 371

[21] Appl. No.: 861,605

[22] Filed: Dec. 19, 1977

[30] Foreign Application Priority Data

Dec. 27, 1976 [JP] Japan .............................. 51-158025

[51] Int. Cl.² ............................................ G01F 1/36
[52] U.S. Cl. ...................................... 73/196; 73/211
[58] Field of Search ................... 73/202, 203, 211, 196

[56] References Cited

U.S. PATENT DOCUMENTS

| | | | |
|---|---|---|---|
| 475,596 | 5/1892 | McDonald | 73/203 |
| 1,944,339 | 1/1934 | Wunsch | 73/202 |
| 2,538,824 | 1/1951 | Andresen, Jr. | 73/196 X |
| 2,949,123 | 8/1960 | Lawrence | 73/196 X |
| 3,034,352 | 5/1962 | Blay | 73/211 |
| 3,315,694 | 4/1967 | Addison | 73/203 |
| 3,411,538 | 11/1968 | Grunner et al. | 137/625.29 |
| 3,425,278 | 2/1969 | Buzza | 73/196 X |
| 3,618,383 | 11/1971 | Holben | 73/203 |

*Primary Examiner*—Herbert Goldstein
*Attorney, Agent, or Firm*—Frank J. Jordan

[57] ABSTRACT

Two pressure-receiving members are provided within a proportional valve interconnecting a main pipe and a bypass line.

The ratio of the rate of fluid flow in the main pipe to the rate of fluid flow in the bypass is held constant by moving vertically a valve plug within the proportional valve by the forces developed by the differential pressure placed across each of these two pressure-receiving members and by adjusting the rate of fluid flow in the bypass so as to keep a constant ratio of the pressure differential created across a restriction in the main pipe to the pressure differential created across a restriction in the bypass. Therefore the rate of fluid flow in the main pipe can be determined from a measurement of the rate of fluid flow in the bypass.

6 Claims, 2 Drawing Figures

FIG. I

METHOD OF AND APPARATUS FOR THE MEASUREMENT OF THE RATE OF FLOW BY MEANS OF A BYPASS

BACKGROUND OF THE INVENTION

This invention relates to a method of and an apparatus for the measurement of the rate of flow of a fluid in a main pipe by means of a bypass.

In order to measure high flow rates of fluid through large diameter pipes large-sized flowmeters are generally required. Thus there are the drawbacks that large size more costly flowmeters must be used as the diameter of the pipe increases.

SUMMARY OF THE INVENTION

An object of the invention is to provide a method and an apparatus which overcome these existing drawbacks.

the present invention provides a method for measurement of the rate of flow of a fluid in a main pipe in which method the ratio of the rate of flow of fluid passing through a restriction within a conduit interposed in the main pipe line to the rate of flow of fluid passing through a restriction in a bypass line is maintained constant. The invention also provides an apparatus for the measurement of the rate of flow of a fluid in a main pipe by means of a proportional valve particularly adapted for carrying out the method of the invention. In accordance with the invention, the high rate of fluid flow in the main pipe can be determined from a measurement of the rate of fluid flow in the bypass lines by means of a small-sized flowmeter.

DETAILED DESCRIPTION OF THE INVENTION

Figure 1:
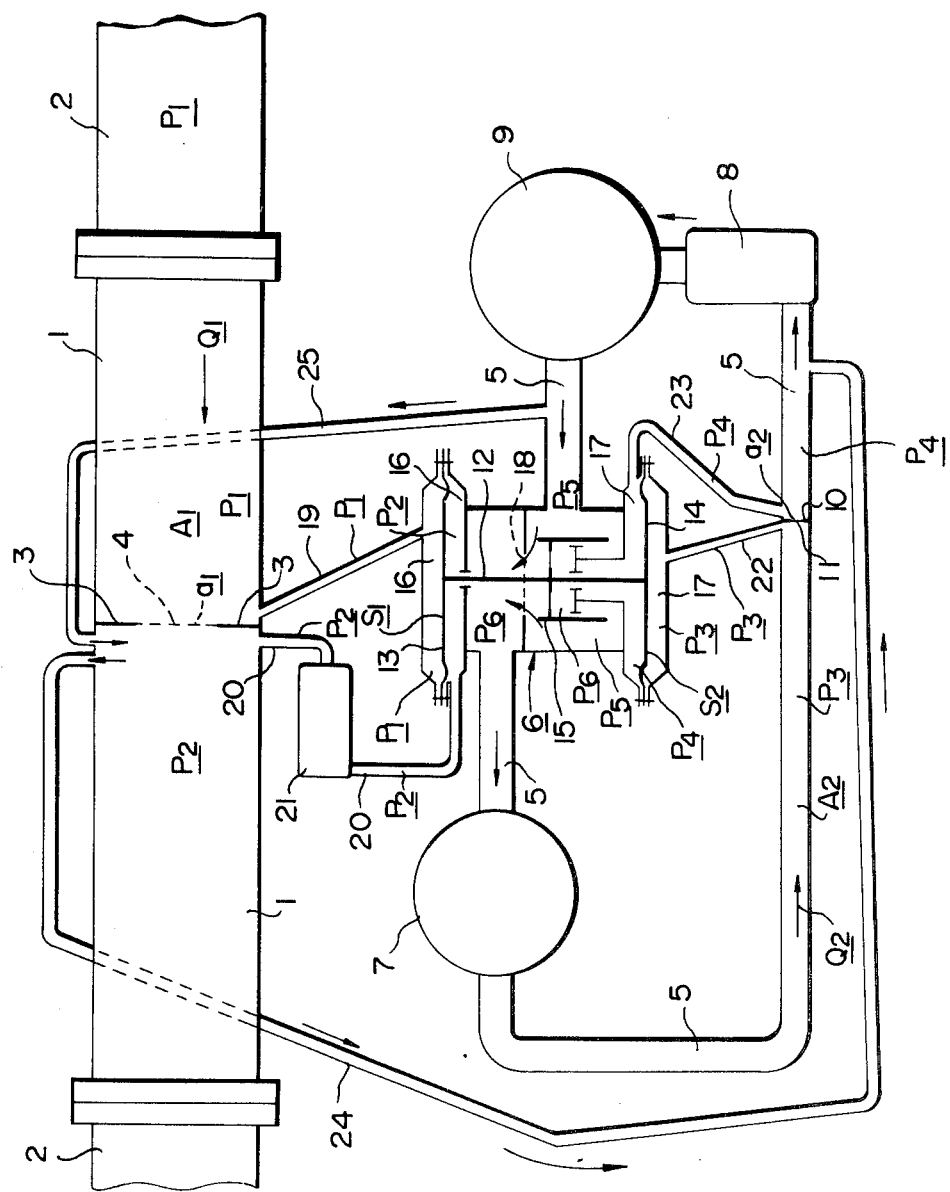
FIG. 1 is a schematic piping drawing which shows fluid flow through a proportional valve and apparatus for the measurement of the rate of flow embodying features of the invention.
Figure 2:
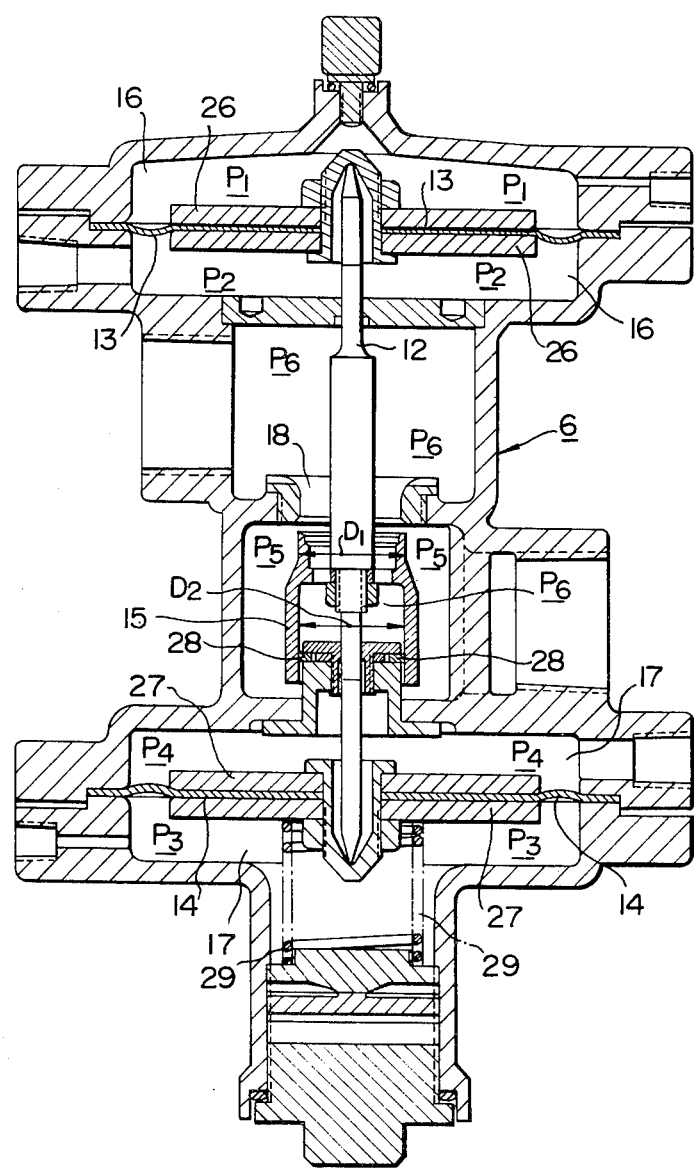
FIG. 2 is a vertical cross-sectional view of a proportional valve suitable for carrying out the method of the invention.

Referring now to FIGS. 1 and 2, the invention is explained with respect to one embodiment thereof. A conduit (1) is interposed within the run of a main pipe (2), and in such conduit (1) there is provided an orifice plate (3), forming a restriction (4) such as an orifice. A proportional valve (6), a flowmeter (7), a strainer (8), and a pump (9) are arranged in series in that order in a bypass line or loop (5). A restriction (11) provided with an orifice plate (10) is formed in the bypass line (5) in the same manner as in the conduit (1). In the proportional valve (6), shown in greater detail in FIG. 2, pressure-receiving members (13) and (14) are secured respectively to the upper and lower ends of a valve rod (12) in such a way that the pressure-receiving members (13) and (14) divide a pair of independent chambers (16) and (17) respectively into two sub-chambers. A valve plug (15) is fixedly mounted to valve rod (12) at approximately the middle portion thereof. A valve port (18) is provided in proportional valve (6) to form an intermediate flow passage for fluids passing through the valve (6) in conjunction with the annular or circumferential upper edge of the valve plug (15). Vertical movement of the valve rod (12) or vertical movement of the valve plug (15) causes such intermediate flow passage to widen or to narrow down. Pump (9) and flowmeter (7) are respectively connected to the inflow and outflow sides of the valve port (18). A pipe (19) is provided and communicates with the outer side of pressure-receiving member (13) and a pipe (20) is provided for communication through a strainer (21) with the inner opposite side of said pressure-receiving member (13). Pipes 19 and 20 are connected respectively to the conduit (1) on the upstream and downstream sides of restriction (4). Similarly a pipe (22) is provided and communicates with the outer side of the other pressure-receiving member (14) and a pipe (23) is provided for communication with the inner side of said pressure-receiving member (14). Pipes 22 and 23 are connected to the bypass (5) on the upstream and downstream sides respectively of restriction (11). It is advantageous to connect an inlet pipe (24) and a discharge pipe (25), both of which communicate with the conduit (1) downstream of the restriction (4), to the bypass line (5).

The proportional valve shown in FIG. 2 is of the vertical type. The pressure-receiving members (13) and (14) may be of the diaphragm type, piston type, or bellows type; however, in the case of the diaphragm or the bellows type, it is advantageous to interpose the member between reinforcing members (26) and (27). The valve plug (15) is formed in the shape of a reducing-coupling-like cylindrical body, the outer diameter $D_1$ of its upper part being equal to the inner diameter $D_2$ of its lower part, and its lower bearing portion being provided with a movable ring (28) and loosely positioned on the valve rod (12). Although the reinforcing member (27) is shown as incorporating a valve spring (29) counter-balancing the dead weight of the valve mechanism, the valve spring (29) is not required in the case of a horizontal proportional valve.

In the method of the invention, preparations for measuring the rate of fluid flow are completed by fixedly interposing the conduit (1) within the run of the main pipe (2) and by filling the bypass line (5) with the fluid. Thus the fluid from the main pipe (2) flows in the direction of the arrow head. If the pressure of the fluid flowing through the main pipe (2) is taken as $P_1$, then the pressure on the upstream side of the restriction (4) in the conduit (1), the pressure in the pipe (19), and the pressure exerted on the outer surface of the pressure-receiving member (13) each become $P_1$. If that pressure on the downstream side of the restriction (4) in the conduit (1), which is reduced to a slight degree by the restriction (4), is taken as $P_2$, then the pressure in the pipe (20) into which the fluid after having been purified through the strainer (21) flows and the pressure exerted on the inner surface of the pressure-receiving member (13) each become $P_2$. Further, if the pressures of the fluid circulated by the operation of the pump (9) through the bypass line (5) in the direction of the arrow head on the upstream and downstream sides of the restriction (11) respectively are taken as $P_3$ and $P_4$, then the pressure in the pipe (22) and the pressure exerted on the outer surface of the pressure-receiving member (14) each become $P_3$ and also the pressure in the pipe (23) and the pressure exerted on the inner surface of the pressure-receiving member (14) each become $P_4$. Furthermore, if the areas of the pressure-receiving members (13) and (14) respectively are taken as $S_1$ and $S_2$, then the following equation holds when the valve mechanism is at rest:

$$(P_1 - P_2) \times S_1 = (P_3 - P_4) \times S_2$$

Rearrange the equation: then $$\frac{P_1 - P_2}{P_3 - P_4} = \frac{S_2}{S_1} \quad (1)$$

When the above equation (1) does not hold, then vertical movement of the valve mechanism or vertical movement of the valve plug (15) adjusts the opening and closing of the intermediate passage formed between the valve port (18) and the annular or circumferential upper edge of the valve plug (15) for fluids passing through the valve (6) until the above equation (1) is satisfied.

Moreover, the relationship between the pressure differential (in this case, $P_1 - P_2$, or $P_3 - P_4$) across the respective restriction (4) or (11) and the rate of flow Q can be expressed by the following equation upon Bernoulli's theorem:

$$Q = ac \sqrt{\frac{2gH\frac{1}{\gamma}}{1 - (\frac{a}{A})^2}}$$

where
- a = area of the passage at the restriction.
- A = cross-sectional area of the pipe immediately upstream of the restriction.
- c = coefficient or exit.
- g = acceleration of gravity.
- $\gamma$ = specific gravity of fluid.

If the cross-sectional areas of the conduit (1) and the bypass (5) on the immediately upstream sides of the restrictions (4) and (11) respectively are represented by $A_1$ and $A_2$, then the ratio of the rate of fluid flow $Q_1$ in the main pipe line to the rate of fluid flow $Q_2$ in the bypass line appears as the equation:

$$\frac{Q_1}{Q_2} = \frac{a_1 c \sqrt{\frac{2gH_1\frac{1}{\gamma}}{1 - (\frac{a_1}{A_1})^2}}}{a_2 c \sqrt{\frac{2gH_2\frac{1}{\gamma}}{1 - (\frac{a_2}{A_2})^2}}}$$

$$= \frac{a_1 c \sqrt{\frac{2g(P_1 - P_2)}{1 - (\frac{a_1}{A_1})^2}}}{a_2 c \sqrt{\frac{2g(P_3 - P_4)}{1 - (\frac{a_2}{A_2})^2}}}$$

$$= \frac{a_1 \sqrt{P_1 - P_2} \sqrt{1 - (\frac{a_2}{A_2})^2}}{a_2 \sqrt{P_3 - P_4} \sqrt{1 - (\frac{a_1}{A_1})^2}}$$

If this equation is substituted by the equation (1) when the valve mechanism is at rest, then the resulting ratio appears as $$\frac{Q_1}{Q_2} = \frac{a_1 \sqrt{S_2} \sqrt{1 - (\frac{a_2}{A_2})^2}}{a_2 \sqrt{S_1} \sqrt{1 - (\frac{a_1}{A_1})^2}} \ldots \text{constant.}$$

Hence the valve mechanism can be moved by providing the restrictions (4) and (11) such as orifice plates or venturi tubes in the line of the main pipe (the conduit (1)) and in the line of the bypass (5) (restriction 11) respectively, by communicating the pressures on the upstream and downstream sides of each of the restrictions (4) and (11) to the respective outer and inner surfaces of each of the two pressure-receiving members (13) and (14) respectively, and by utilizing the forces developed by the pressure differential across each of the pressure-receiving members (13) and (14). Therefore the ratio of the rate of fluid flow $Q_1$ in the line of the main pipe to the rate of fluid flow $Q_2$ in the bypass line is held constant by adjusting the rate of fluid flow in the line of the bypass so as to keep a constant ratio of the pressure differential created across the restriction (4) in the line of the main pipe to the pressure differential created across the restriction (11) in the line of the bypass; that is, the rate of fluid flow in the line of the main pipe can be easily determined according to such constant ratio from a measurement of the rate of fluid flow in the line of the bypass. In addition, since the valve plug (15) incorporated into the proportional valve (6) is dimensioned in such a way that the outer diameter $D_1$ of its upper part is equal to the inner diameter $D_2$ of its lower part, if the pressures of the fluid flowing through the valve mechanism on the upstream and down stream sides of the valve port (18) respectively are represented by $P_5$ and $P_6$, the forces capable of vertically moving the valve mechanism do not arise under varying conditions of the pressure differential ($P_5 - P_6$), which thereby increases the degree of measurement accuracy of this apparatus. Further, since the movable ring (28) can freely move horizontally, fluid leakage at the valve mechanism is prevented and friction is reduced. Besides, the valve spring (29) incorporated into the proportional valve (6) balances the one pressure differential ($P_1 - P_2$) with the other pressure differential ($P_3 - P_4$) against the dead weight of the valve mechanism.

In an apparatus according to the invention, providing the pressure-receiving members (13) and (14) at the opposite ends of the valve rod (12) as shown in FIGS. 1 and 2 is not necessarily required: two such pressure-receiving members can be provided at either the upper or lower part of the valve rod (12) by suitable design change. The use of the very large-sized pressure-receiving members (13) and (14) as compared with the size of the valve plug (15) minimizes the effects which pressures $P_5$ and $P_6$ exercise, which permits the degree of accuracy of measurement to be held relatively high even when the valve plug (15) is used. Since circulating the same fluid through the bypass line (5) by operation of the pump (9) causes the temperature of the fluid to increase, in order to prevent any problems which may arise due to thermal changes in the fluid, some of the fluid can be continuously replaced by providing the intake pipe (24) and the discharge pipe (25) as desired.

As above-mentioned, according to the method and apparatus of the invention the high rate of fluid flow in the main pipe can be measured by means of a small-sized, low-priced flowmeter. The use of an integrating flowmeter or indicating flowmeter as the flowmeter will extend the desired range of application.

A restriction is thus provided within each of a conduit interposed in the main pipe line and within a bypass line. Pressures on the upstream and downstream sides of each of the restrictions respectively are communicated to the opposed sides of each of two pressure-receiving members. The ratio of the rate of fluid flow in the main pipe to the rate of fluid flow in the bypass is held constant by moving a valve plug in accordance with the forces developed due to the pressure differential placed across each of the pressure-receiving members and by adjusting the rate of fluid flow in the bypass line so as to keep a constant ratio of the pressure differential created across the restriction in the conduit to the pressure differential created across the restriction in the bypass line. Thus the rate of flow of fluid in the main pipe is determined from a measurement of the rate of fluid flow in the bypass.

What is claimed is:

1. Apparatus for measuring the flow rate of a fluid in a main pipe comprising first restriction means in said main pipe for restricting a cross-sectional flow area of said main pipe, a loop circuit comprising pipe of relatively smaller dimension than the main pipe, pump means in said loop circuit for circulating fluid through said loop circuit, fluid flow measuring means for measuring the fluid flow in said loop circuit, second restriction means in said loop circuit for restricting the cross-sectional flow area in said loop circuit, proportional control means in said loop circuit, said proportional control means comprising valve means for regulating the fluid flow through said loop circuit, said proportional control means further comprising first and second pressure-receiving means operatively connected to said valve means, said valve means comprising a valve body having a valve port, a valve plug cooperable within said valve port, said valve plug having a first portion cooperable with said valve port to effect control of fluid through said valve port, said valve plug having a second portion which is hollow and disposed on the downstream side of said valve port, said first port, said first portion of said valve having an outer diameter equal to the inner diameter of said second hollow portion of said valve plug, a valve rod mounting said valve plug such that said valve rod and valve plug are movable as a unit, said valve rod being connected at the opposed ends thereof respectively to said first and second pressure receiving means, and first and second conduit means connecting said first and second pressure-receiving means respectively to said main pipe and said loop circuit upstream and downstream of the respective first and second restriction means, whereby the rate of flow in said loop circuit circulated in the loop circuit by the pump means is adjusted by said valve means to maintain a constant ratio between the pressure differential across said first and second pressure-receiving means respectively such that the rate of flow in said main pipe is determined by the fluid flow measuring means in said loop circuit.

2. Apparatus according to claim 1, wherein said valve rod has its longitudinal axis vertically disposed, and a spring means for supporting the weight of said valve means.

3. Apparatus according to claim 1, wherein said first and second restricting means each comprise orifice plates.

4. Apparatus according to claim 1, wherein said first and second pressure-receiving means each comprise diaphragms.

5. Apparatus for measuring the flow rate of a fluid in a relatively large diameter main pipe utilizing a relatively small flow meter which measures a rate of flow in a recirculating circuit in which the flow rate is less than but proportional to the flow rate in said main pipe, comprising first restriction means in said main pipe for restricting a cross-sectional flow area of said main pipe, a recirculating circuit closed to the surrounding atmosphere and providing an endless path through which fluid is recirculated, said recirculating means comprising piping of relatively smaller inner diameter than the main pipe, pump means in said recirculating circuit for continuously recirculating fluid through said recirculating circuit, fluid flow measuring means for measuring the fluid flow in said recirculating circuit, second restriction means in said recirculating circuit for restricting the cross-sectional flow area in said recirculating circuit, proportional control means in said recirculating circuit, said proportional control means comprising valve means for regulating the fluid flow through said recirculating circuit, said proportional control means further comprising first and second pressure-receiving means operatively connected to said valve means, first and second conduit means connecting said first and second pressure-receiving means respectively to said main pipe and said recirculating circuit upstream and downstream of the respective first and second restriction means, whereby the rate of flow in said recirculating circuit circulated in the recirculating circuit by the pump means is adjusted by said valve means to maintain a constant ratio between the pressure differential across said first and second pressure-receiving means respectively such that the rate of flow in said main pipe is determined by the fluid flow measuring means in said recirculating circuit, an inlet conduit extending between said main pipe and said recirculating circuit, and a discharge conduit extending between said main pipe and said recirculating circuit, said inlet conduit and said discharge conduit being connected to said recirculating circuit at the inlet and discharge sides respectively of said pump means, whereby the fluid flowing through the recirculating circuit is continuously replaced by fluid from the main pipe to thereby preclude overheating of the recirculating fluid flowing in the recirculating circuit.

6. Apparatus according to claim 5, wherein said intake conduit and said discharge conduit are connected to said main conduit downstream of said first restriction means.

* * * * *